United States Patent
Hsu et al.

(10) Patent No.: US 10,506,849 B2
(45) Date of Patent: Dec. 17, 2019

(54) TRANSPORT APPARATUS FOR CONVEYING SHOE SOLE

(71) Applicant: Pou Chen Corporation, Chang Hwa Hsien (TW)

(72) Inventors: Chien-Yu Hsu, Chang Hwa Hsien (TW); Yu-Fong Yang, Chang Hwa Hsien (TW); Wei-Hsin Hsu, Chang Hwa Hsien (TW); Hsiang-En Peng, Chang Hwa Hsien (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 0 days.

(21) Appl. No.: 16/168,920

(22) Filed: Oct. 24, 2018

(65) Prior Publication Data

US 2019/0150571 A1 May 23, 2019

(30) Foreign Application Priority Data

Nov. 23, 2017 (TW) .............................. 106140666 A

(51) Int. Cl.
| | | |
|---|---|---|
| B65G 47/74 | (2006.01) | |
| B65G 13/00 | (2006.01) | |
| B65G 21/00 | (2006.01) | |
| A43D 11/14 | (2006.01) | |
| A43D 111/00 | (2006.01) | |
| B65G 35/06 | (2006.01) | |

(Continued)

(52) U.S. Cl.
CPC ........ *A43D 11/145* (2013.01); *A43D 111/003* (2013.01); *B65G 13/04* (2013.01); *B65G 35/063* (2013.01); *B23P 21/006* (2013.01); *B65G 2201/0214* (2013.01)

(58) Field of Classification Search
None
See application file for complete search history.

(56) References Cited

U.S. PATENT DOCUMENTS

| | | | | |
|---|---|---|---|---|
| 4,319,676 A | * | 3/1982 | Turnbough | .......... B65G 47/844 198/449 |
| 6,938,750 B2 | * | 9/2005 | Miller | .................. B65G 17/345 198/370.04 |

FOREIGN PATENT DOCUMENTS

| | | |
|---|---|---|
| CN | 107125851 A | 9/2017 |
| TW | M546713 U | 8/2017 |

OTHER PUBLICATIONS

Search Report appended to an Office Action, which was issued to Taiwanese counterpart application No. 106140666 by the TIPO dated Jun. 19, 2018, with an English translation thereof (2 pages).

* cited by examiner

*Primary Examiner* — Kavel Singh
(74) *Attorney, Agent, or Firm* — Hamre, Schumann, Mueller & Larson, P.C.

(57) ABSTRACT

A transport apparatus is for conveying a shoe sole, and includes a rail unit divided into process and bridge regions, a delivery device and a transfer device. The delivery device is movable in the process and the bridge regions, and includes a conveyor belt for carrying the shoe sole and to move the shoe sole on the rail unit. The transfer device is located adjacent to the bridge region, and includes a transfer roller assembly and a transfer belt, which surrounds the transfer roller assembly and is drivable by the same for carrying the shoe sole. When the delivery device is in the bridge region, the conveyor belt is adjacent to the transfer belt, and is operable to convey the shoe sole onto the transfer belt.

8 Claims, 10 Drawing Sheets

(51) Int. Cl.
*B65G 13/04* (2006.01)
*B23P 21/00* (2006.01)

TRANSPORT APPARATUS FOR CONVEYING SHOE SOLE

CROSS-REFERENCE TO RELATED APPLICATION

This application claims priority of Taiwanese Invention Patent Application No. 106140666, filed on Nov. 23, 2017.

FIELD

The disclosure relates to a transport apparatus, and more particularly to a transport apparatus for conveying shoe sole.

BACKGROUND

Referring to FIGS. 1 and 2, a conventional transport apparatus 1 is adapted for conveying a shoe sole 102. The conventional transport apparatus 1 includes a looped track 11 and a plurality of carriers 12. Each of the carriers 12 is mounted to the looped track 11, and is operable to move on the looped track 11. Each of the carriers 12 includes a bracket 121 adapted to be mounted with a shoe last 101 which can be used for carrying a shoe vamp 104, and a carrier plate 122 located below the bracket 121 for carrying the shoe sole 102. A plurality of processing devices 103 may be provided along the looped track 11 for performing adhesive applying, adhesive spraying, baking, etc. The shoe sole 102 is completely processed by the processing devices 103 after travelling around the looped track 11. Extra processing devices 103 may be required for performing more complicated process steps. However, the fixed length of the looped track 11 may limit the addition of extra processing devices 103.

SUMMARY

Therefore, an object of the disclosure is to provide a transport apparatus that can alleviate the drawback of the prior art.

According to an aspect of the present disclosure, a transport apparatus is adapted to convey a shoe sole along a conveying direction. The transport apparatus includes a rail unit, a delivery device and a transfer device.

The rail unit extends along the conveying direction, and is divided into a process region and a bridge region along the conveying direction. The delivery device is movably mounted to the rail unit, and is movable in the process region and the bridge region. The delivery device includes a conveyor belt that is adapted to carry the shoe sole and to move the shoe sole on the rail unit. The transfer device is connected to the rail unit, and is located adjacent to the bridge region of the rail unit. The transfer device includes a base shell, a transfer roller assembly that is rotatably mounted to the base shell, an actuating device that is operable to drive rotation of the transfer roller assembly, and a transfer belt that surrounds the transfer roller assembly and that is adapted to carry the shoe sole.

When the delivery device is in the bridge region, the conveyor belt of the delivery device is adjacent to the transfer belt of the transfer device, and is operable to convey the shoe sole onto the transfer belt.

BRIEF DESCRIPTION OF THE DRAWINGS

Other features and advantages of the disclosure will become apparent in the following detailed description of the embodiment and variation with reference to the accompanying drawings, of which.

DETAILED DESCRIPTION

Figure 1:
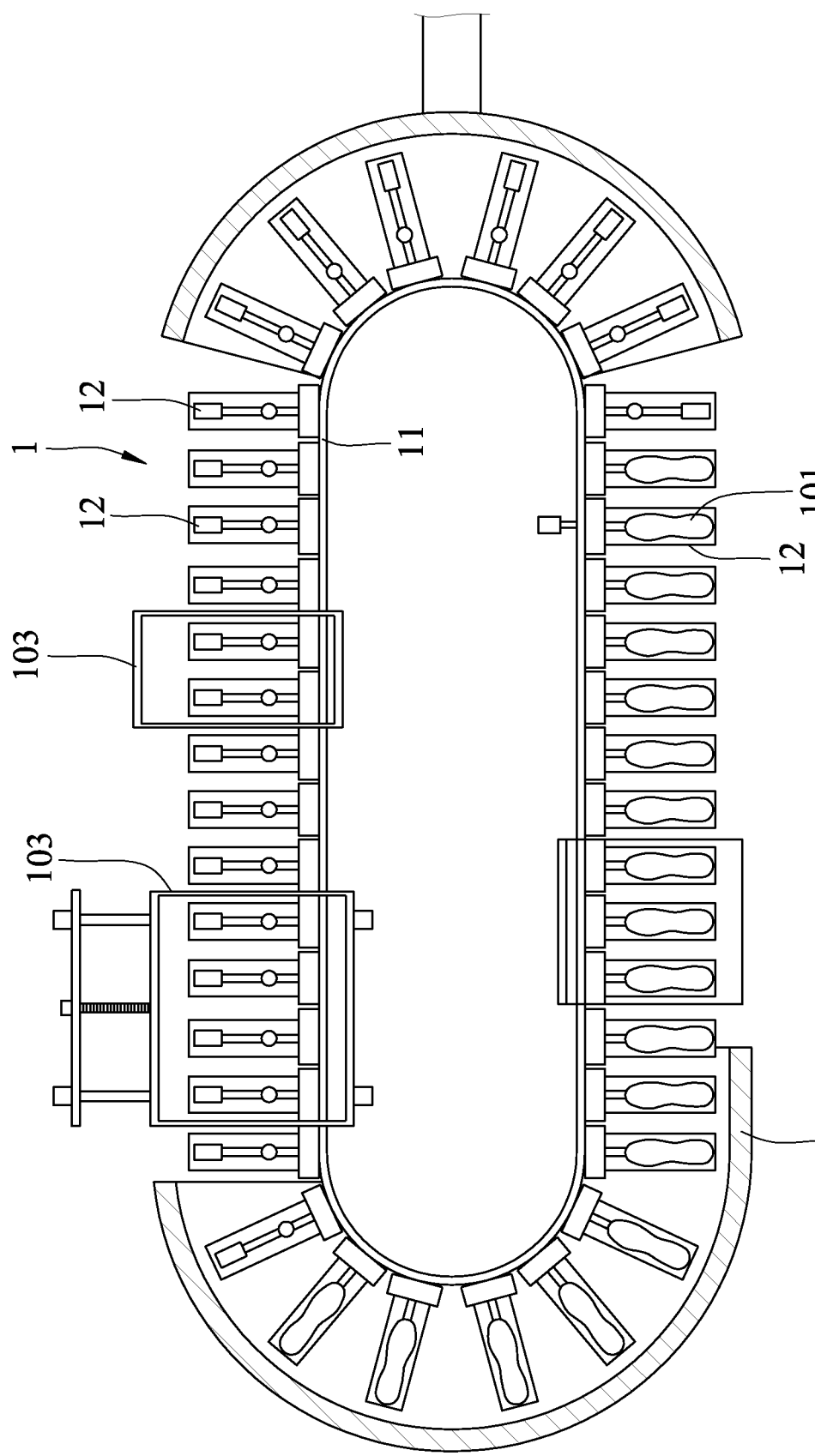
FIG. 1 is a schematic top view of a conventional transport apparatus.
Figure 2:
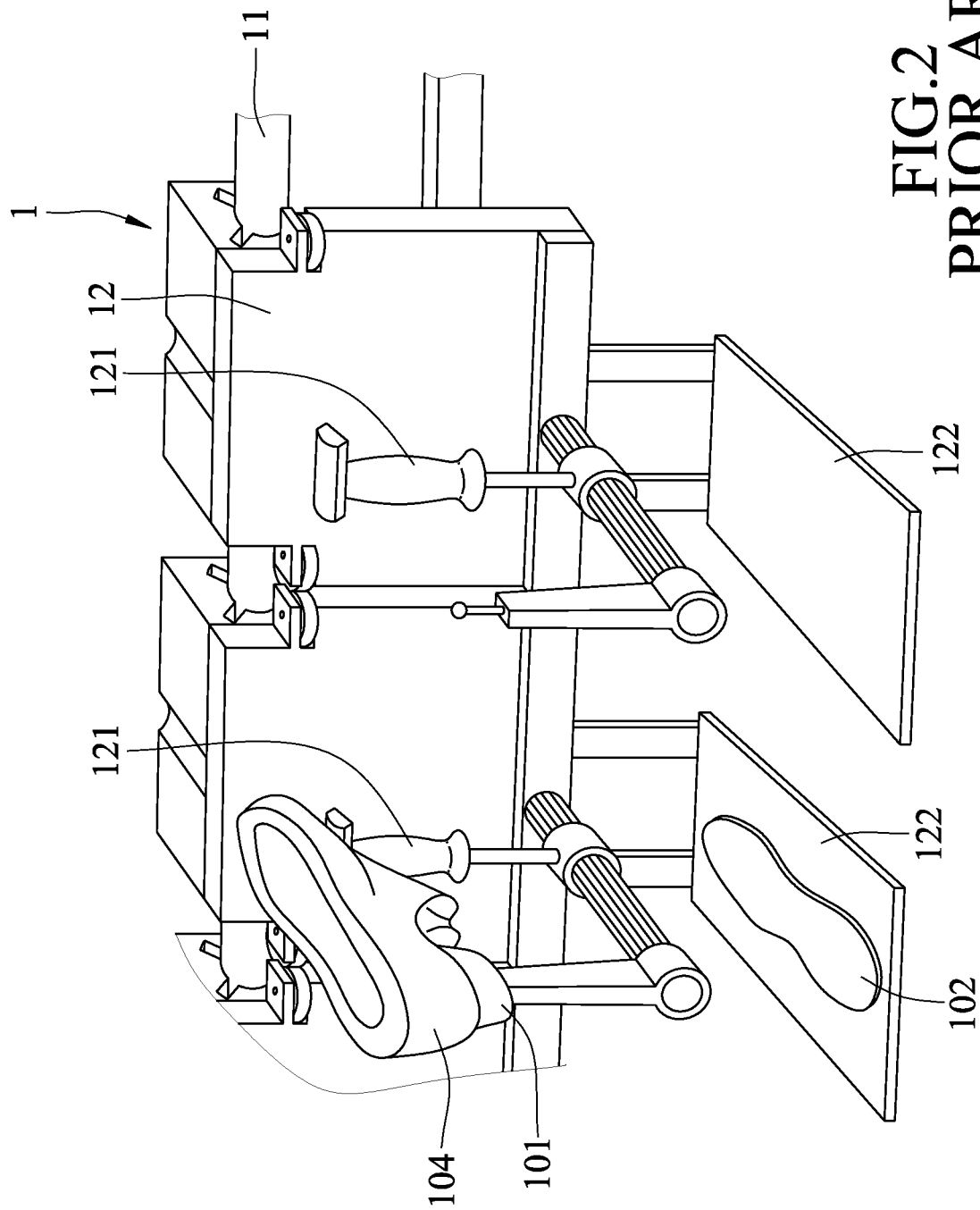
FIG. 2 is a fragmentary perspective view of the conventional transport apparatus.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
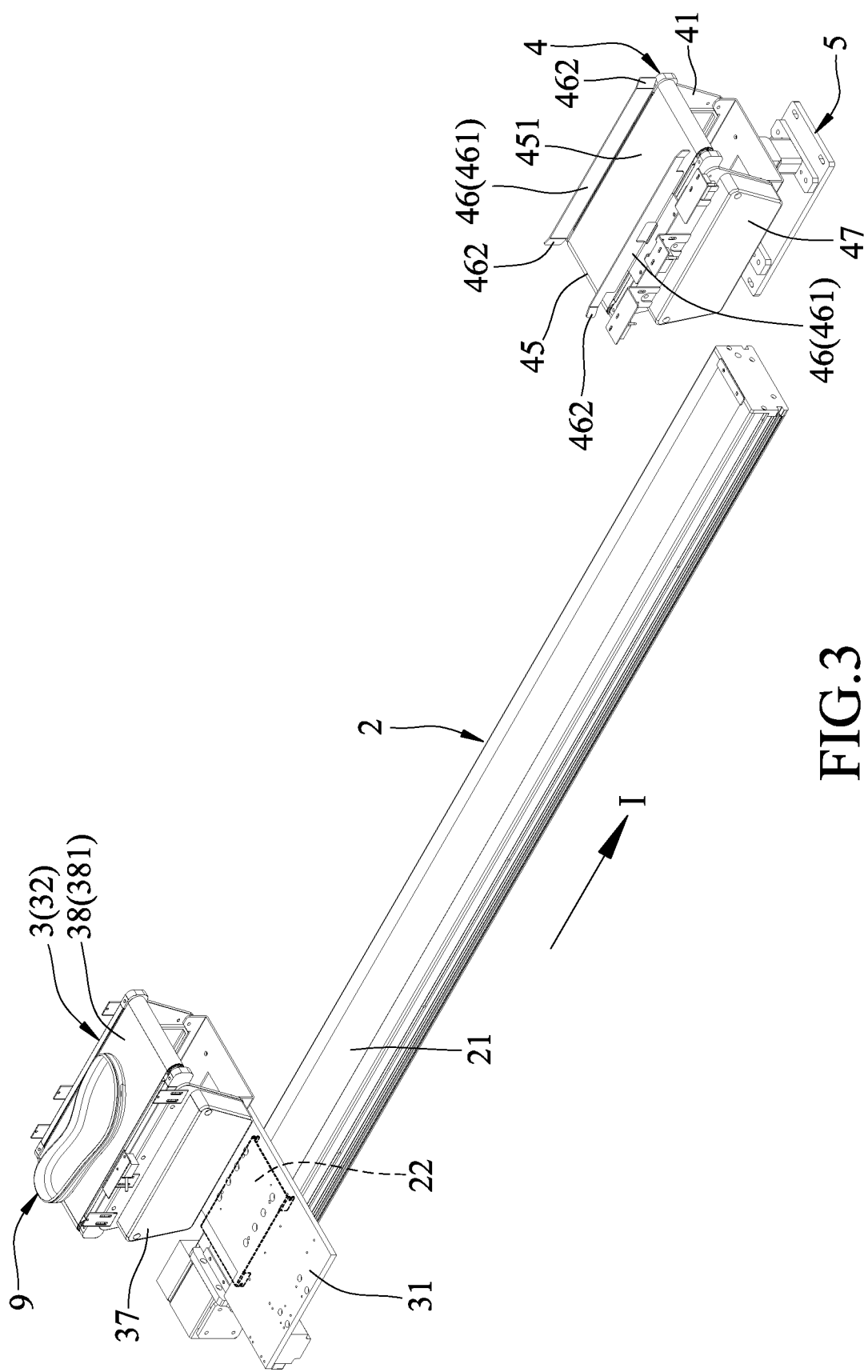
FIG. 3 is a partially exploded perspective view of an embodiment of a transport apparatus according to the present disclosure.
Figure 4:
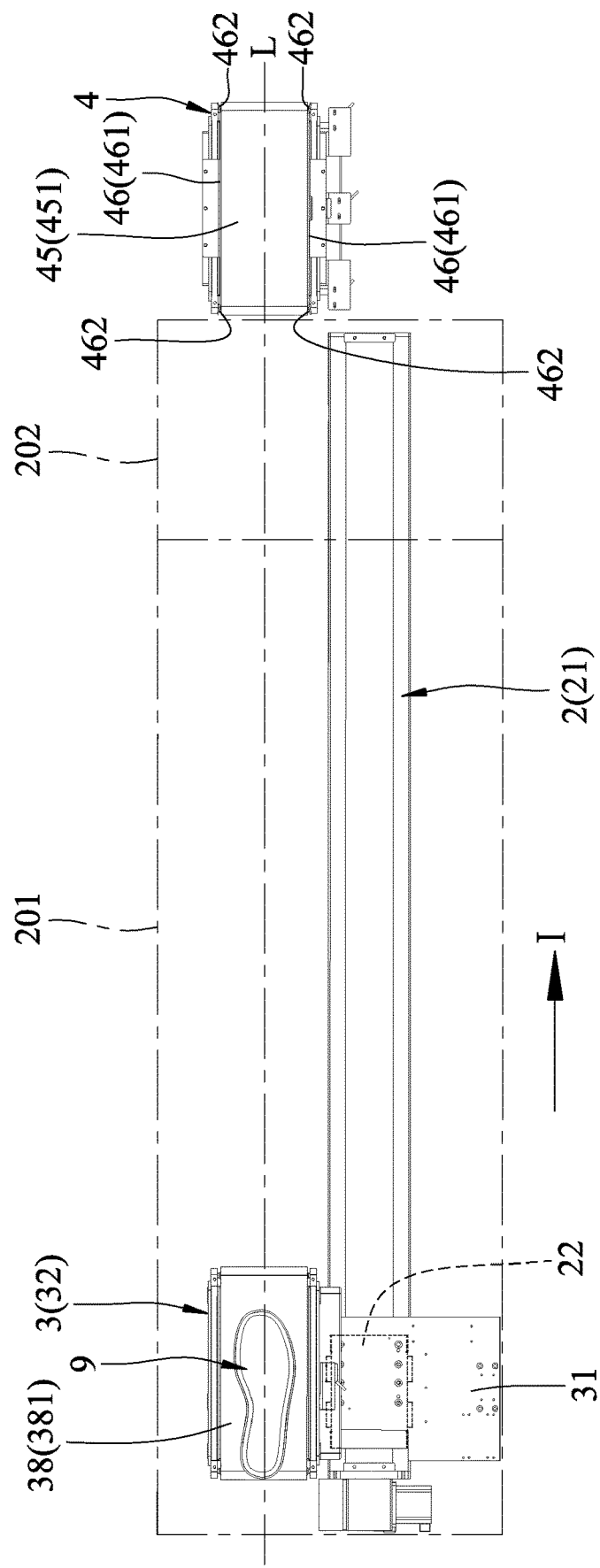
FIG. 4 is a schematic top view of the embodiment.

Referring to FIGS. 3 and 4, an embodiment of a transport apparatus is adapted to convey a shoe sole 9 along a conveying direction (I) in a conveying path (L). The transport apparatus includes a rail unit 2, a delivery device 3 and a transfer device 4.

The rail unit 2 is divided into a process region 201 and a bridge region 202 along the conveying direction (I). The rail unit 2 includes rail 21 that extends along the conveying direction (I), and a moving seat 22 that is movably mounted to the rail 21 and that is movable along the conveying direction (I). The rail unit 2 is one of a rodless pneumatic cylinder, a conveyer and a linear slide track. In this embodiment, the rail unit 2 is the linear slide track.

The delivery device 3 is movably mounted to the rail unit 2, and is movable in the process region 201 and the bridge region 202. Specifically, the delivery device 3 includes a carrier seat 31 that is mounted to the moving seat 22, and a conveyor unit 32 that is mounted to the carrier seat 31.

Figure 5:
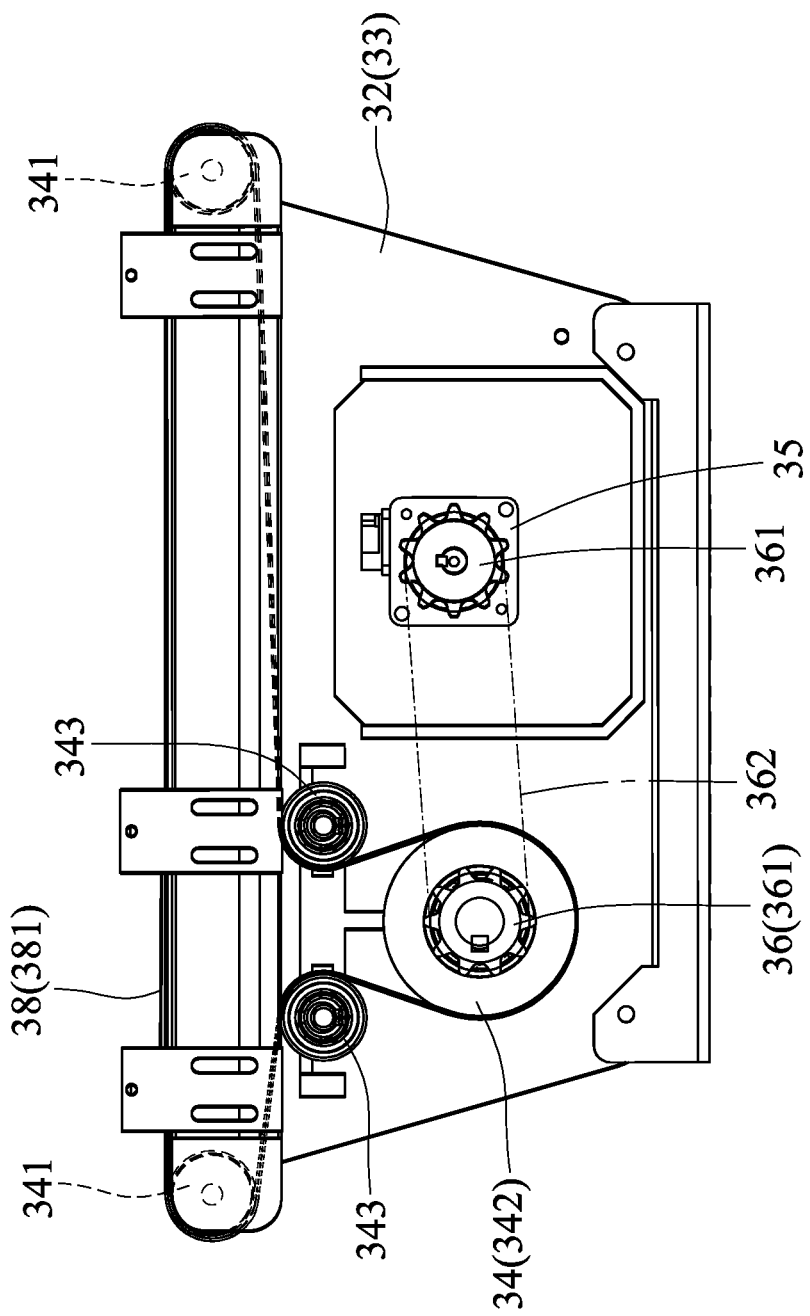
FIG. 5 is a side view of a conveyor unit of a delivery device of the embodiment, wherein apart of a unit shell and a side shell of the conveyor unit are omitted for illustrating components of the conveyor unit.

Referring to FIGS. 3 and 5, the conveyor unit 32 includes a unit shell 33, a delivery roller assembly 34 that is mounted to the unit shell 33, a driving device 35 that is mounted to the unit shell 33, a driving gear set 36, a side shell 37 and a conveyor belt 38. The delivery roller assembly 34 includes at least one delivery roller 341 that is rotatably mounted to the unit shell 33. In this embodiment, the delivery roller assembly 34 includes two of the delivery rollers 341. The delivery roller assembly 34 further includes a driving roller 342 that is rotatably mounted to the unit shell 33, that is located below the delivery rollers 341 and that has a diameter larger than that of each of the delivery rollers 341. The conveyor belt 38 surrounds the delivery rollers 341 and the driving roller 342. The driving gear set 36 is connected between the driving device and the driving roller 342 of the delivery roller assembly 34 such that the conveyor belt 38 is drivable by the driving device 35 through the driving gear set 36 and the driving roller 342 to convey the shoe sole 9 in the conveying direction (I). Apart of the conveyor belt 38 spans the delivery rollers 341, and defines a conveyor surface 381 for carrying the shoe sole 9. In this embodiment, the driving device 35 is a motor. The driving gear set 36 is covered by the side shell 37. The driving gear set 36 includes two driving gears 361 and a driving chain 362. The driving gears 361 are respectively connected to rotating shafts of the driving roller 342 and the driving device 35. The driving chain 362 surrounds and meshes with the driving gears 361.

Figure 6:
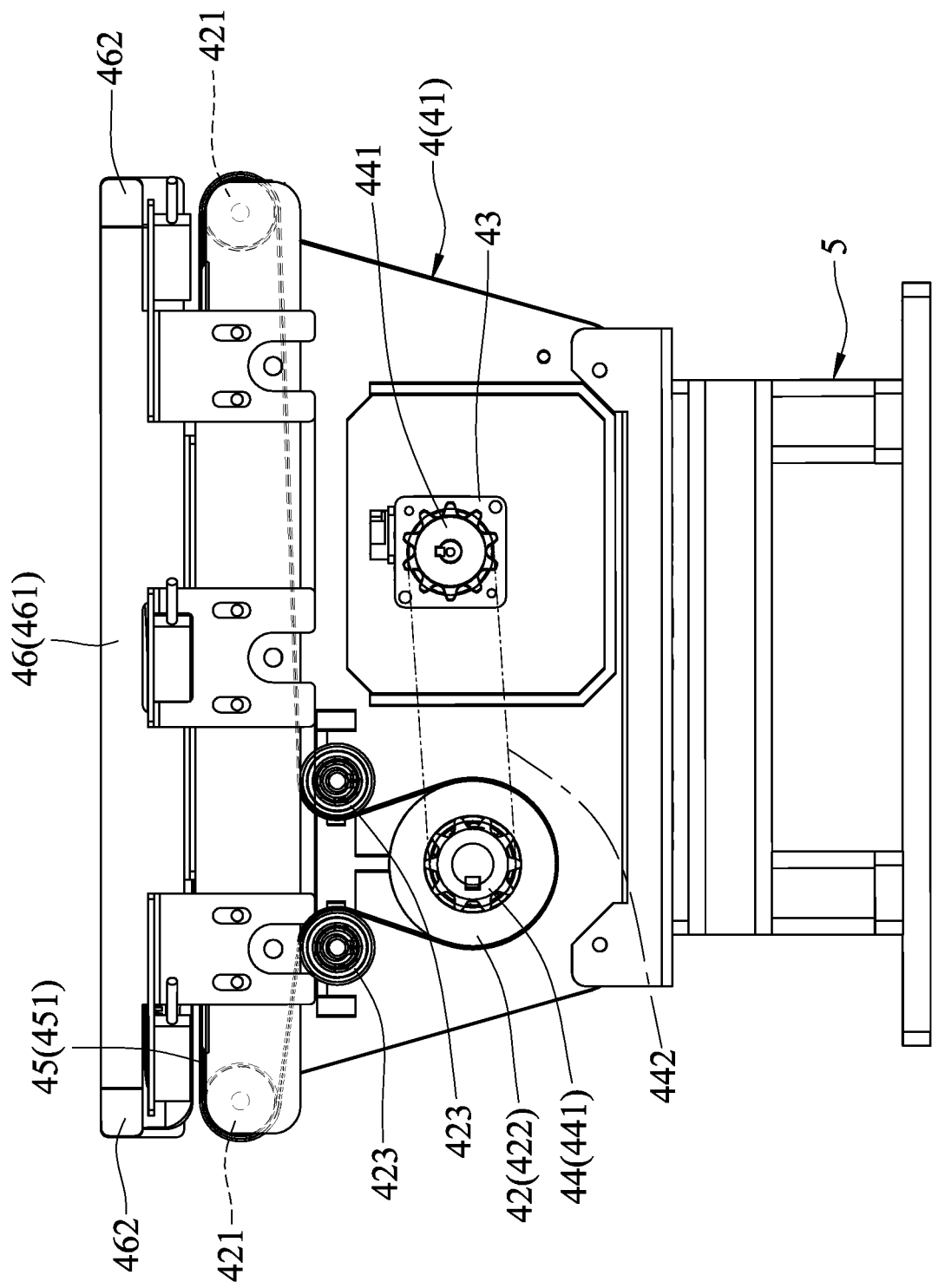
FIG. 6 is a side view of a transfer device of the embodiment, wherein a part of a base shell and a side cover of the transfer device are omitted for illustrating components of the transfer device.

The delivery roller assembly 34 further includes two tension rollers 343 that are movably disposed in the unit shell 33, and that are located between the delivery rollers 341 and the driving roller 342. The tension rollers 343 are operable to move toward each other to increase the tension of the conveyor belt 38. The tension rollers 343 are also operable to move away from each other to reduce the tension of the conveyor belt 38. Referring to FIGS. 3, 4 and 6, the transfer device 4 is connected to the rail unit 2 and is located adjacent to the bridge region 202 of the rail unit 2. In this embodiment, the transfer device 4 is located in the conveying path (L) of the shoe sole 9. Specifically, the transfer device 4 is mounted to a base seat 5, and includes a base shell 41, a transfer roller assembly 42 that includes at least one transfer roller 421 rotatably mounted to the base shell 41, an actuating device 43 that is operable to drive rotation of the at least one transfer roller 421, an actuating gear set 44, a side cover 47, a transfer belt 45 that is adapted to carry the shoe sole 9, and two guiding plates 46 that extend along the conveying direction (I).

In this embodiment, the transfer roller assembly 42 includes two of the transfer rollers 421, and an actuating roller 422 that is rotatably mounted to the base shell 41, that is located below the transfer rollers 421 and that has a diameter larger than that of each of the transfer rollers 421. The transfer belt 45 surrounds the transfer rollers 421 and the actuating roller 422. A portion of the transfer belt 45 spans the transfer rollers 421, and defines a transfer surface 451 for carrying the shoe sole 9. In this embodiment, the actuating device 43 is a motor. The actuating gear set 44 is covered by the side cover 47. The actuating gear set 44 includes two actuating gears 441 and an actuating chain 442. The actuating gears 441 are respectively connected to rotating shafts of the actuating roller 422 and the actuating device 43. The actuating chain 442 surrounds and meshes with the actuating gears 441. The transfer belt 45 is drivable by the actuating device 43 to convey the shoe sole 9 along the conveying direction (I).

The transfer roller assembly 42 further includes two adjusting rollers 423 that are movably disposed in the base shell 41, and that are located between the transfer rollers 421 and the actuating roller 422. The adjusting rollers 423 are operable to move toward each other to increase the tension of the transfer belt 45. The adjusting rollers 423 are also operable to move away from each other to reduce the tension of the transfer belt 45.

The guiding plates 46 are mounted to the base shell 41, are respectively located at opposite sides of the transfer belt 45, and are adapted for guiding the shoe sole 9 to be conveyed therebetween along the conveying direction (I). Each of the guiding plates 46 has a main body 461, and two guiding sections 462 that are respectively connected to opposite ends of the main body 461 and that each extend away from the main body 461 and the transfer belt 45. In this embodiment, the main bodies 461 of the guiding plates 46 are parallel to each other.

Figure 7:
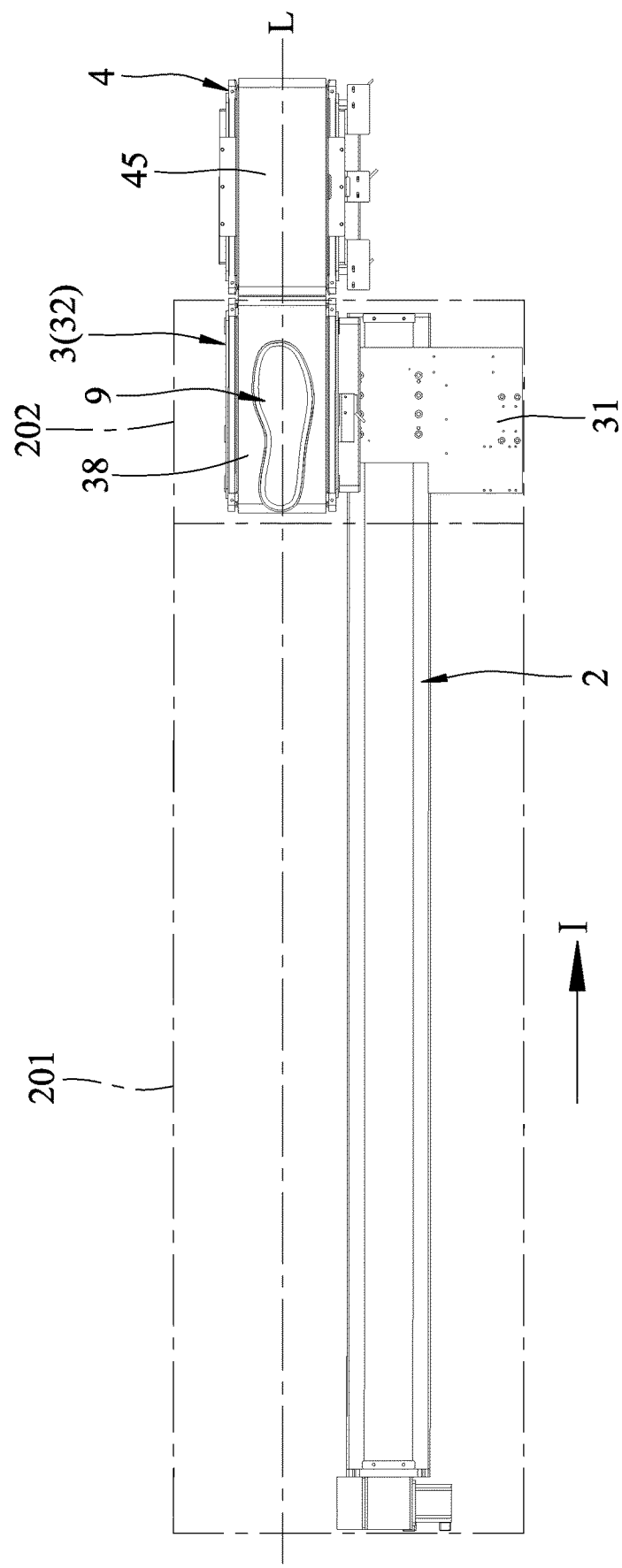
FIG. 7 is a schematic top view of the embodiment, wherein a shoe sole is conveyed to a bridge region of a rail unit of the embodiment by the delivery device.

Referring to FIGS. 4 and 7, the delivery device 3 is operable to carry the shoe sole 9 to move between the process region 201 and the bridge region 202. When the shoe sole 9 is in the process region 201, it is treated with various processes, such as adhesive applying, roughening, brushing, baking, etc. Suitable processing machines (not shown) or robotic arms (not shown) may be utilized for such processing. After processing, the shoe sole 9 is conveyed to the bridge region 202.

Figure 8:
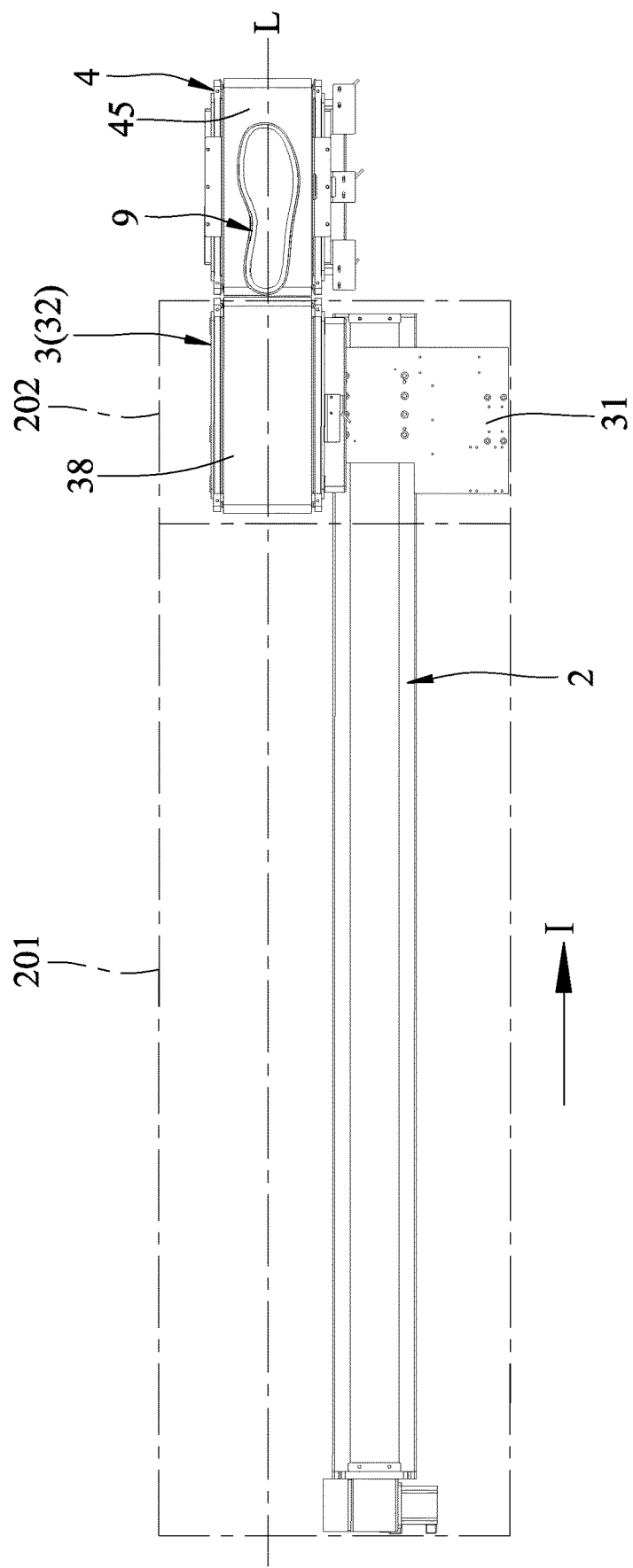
FIG. 8 is a schematic top view of the embodiment, wherein the shoe sole is conveyed to the transfer device.

Referring to FIGS. 7 and 8, when the shoe sole 9 is moved to the bridge region 202 by the delivery device 3, the conveyor belt 38 of the delivery device 3 is adjacent to the transfer belt 45 of the transfer device 4, and the conveyor belt 38 is operated to convey the shoe sole 9 onto the transfer belt 45. Specifically, referring further to FIGS. 5 and 6, the driving device 35 of the delivery device 3 and the actuating device 43 of the transfer device 4 are simultaneously operated to rotate, such that the conveyor belt 38 and the transfer belt 45 are simultaneously activated to convey the shoe sole 9 from the conveyor belt 38 to the transfer belt 45.

Figure 9:
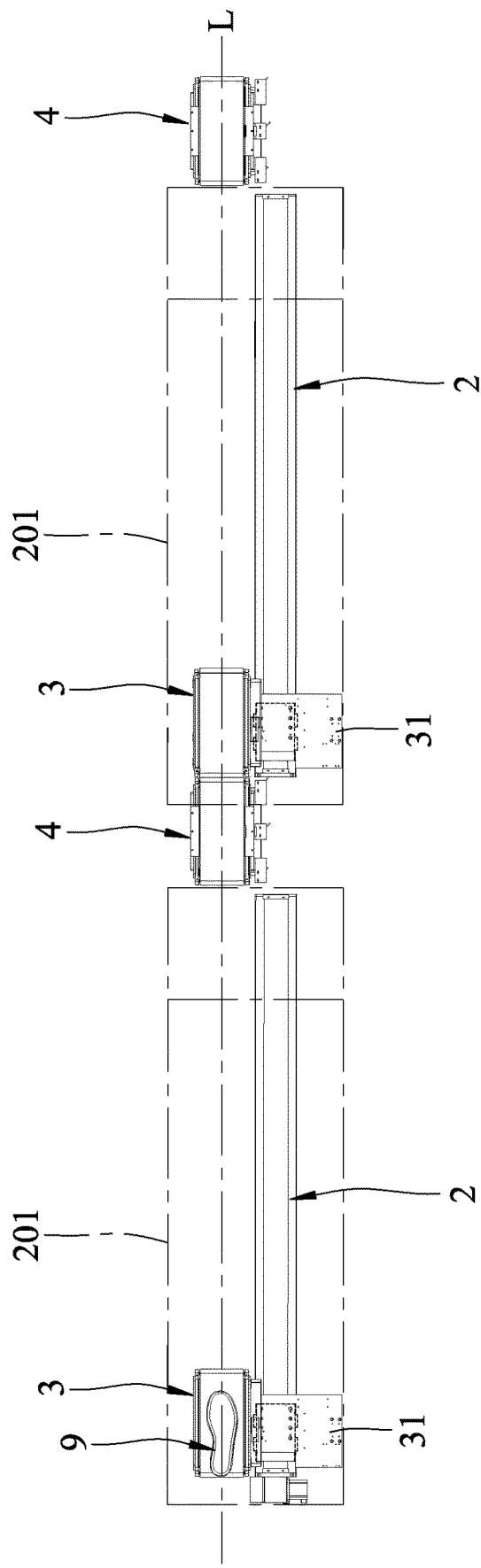
FIG. 9 is a schematic top view, showing two of the embodiments connected together.

It is worth mentioning that a plurality of the transport apparatuses of this disclosure can be connected in the conveying direction (I) to obtain multiple process regions 201 for processing the shoe sole 9. The adhesive applying, roughening, brushing, baking processes can be respectively carried out at the process regions 201 of the transport apparatuses. Therefore, the shoe sole 9 can be sequentially processed using the transport apparatuses. In other words, the transport apparatuses according to the present disclosure are modularized and can be easily increased or reduced in number depending on practical requirements. FIG. 9 shows two of the transport apparatuses connected in the conveying direction (I) to provide two of the process regions 201, and the transfer device 4 shown in the middle of the figure bridges the two transport apparatuses and conveys the shoe sole 9 between the two process regions 201. It should be noted that the number of the transport apparatuses should not be limited to two, and can be changed according to practical requirements. Moreover, the processing step can be independently taken place at each of the process regions 201, thereby increasing the overall productivity since multiple processing steps can be taken place simultaneously without the need of waiting for other process to finish.

The carrier seat 31 of the delivery device 3 may be configured to carry other shoe parts, such as a sole vamp (not shown). Accordingly, a suitable equipment can be provided in the process region 201 to process the shoe vamp.

Figure 10:
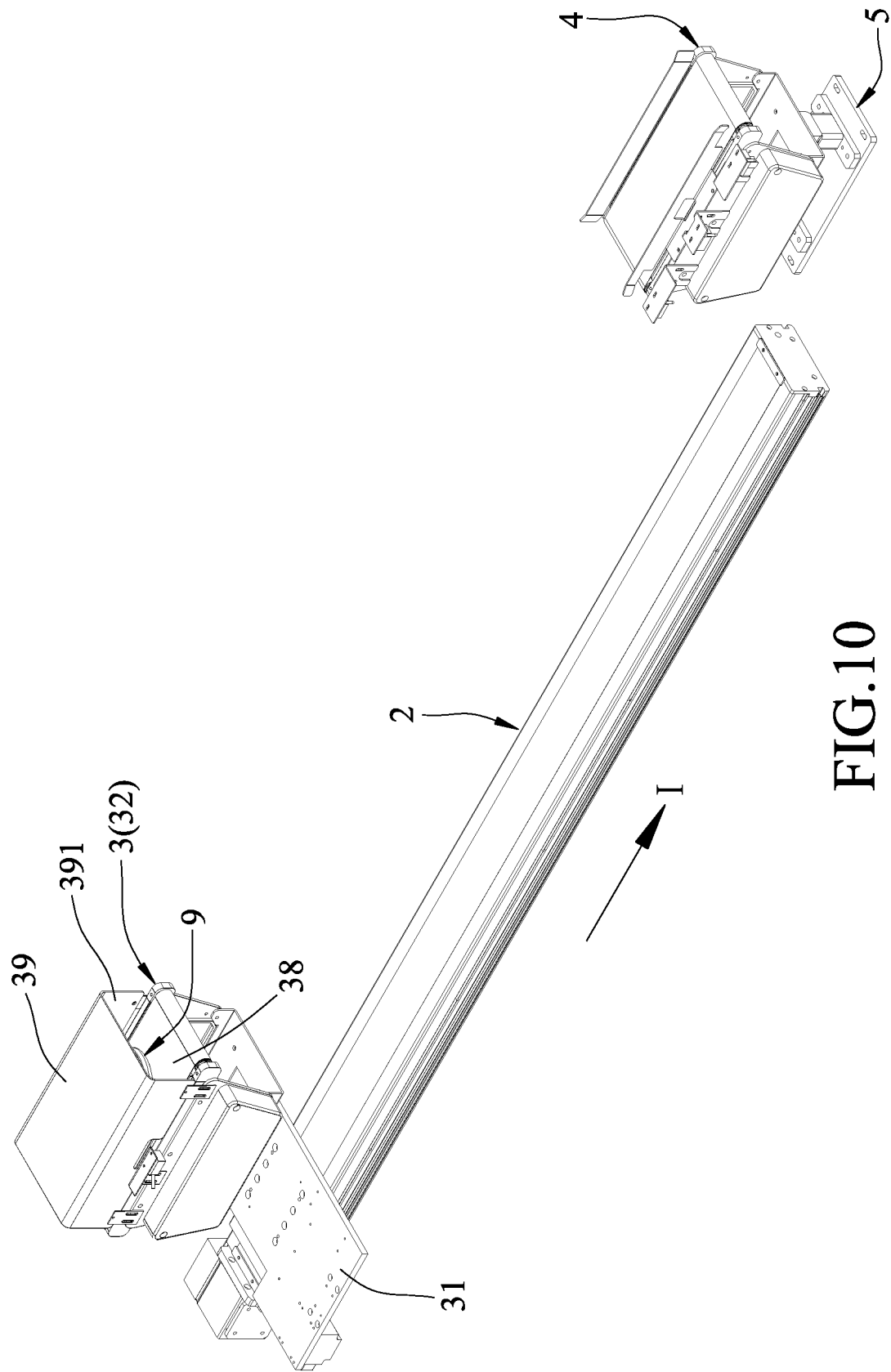
FIG. 10 is a perspective view of a variation of the embodiment, wherein the delivery device is provided with a protection cover.

Referring to FIG. 10, in a variation of the embodiment, the delivery device 3 further includes a protect ion cover 39 that is mounted to a top end of the conveyor unit 32 and that cooperates with the conveyor belt 38 to define a channel 391 extending along the conveying direction (I) and adapted for the shoe sole 9 to stay therein or pass therethrough. The protection cover 39 may be optionally provided for protecting the shoe sole 9 in the circumstances where there are hazardous substances that are produced by other machines and that can affect or even damage the shoe sole 9.

While the disclosure has been described in connection with what are considered the exemplary embodiment and variation, it is understood that this disclosure is not limited to the disclosed embodiment and variation but is intended to cover various arrangements included within the spirit and scope of the broadest interpretation so as to encompass all such modifications and equivalent arrangements.

What is claimed is:

1. A transport apparatus adapted to convey a shoe sole along a conveying direction, said transport apparatus comprising:
a rail unit that is divided into a process region and a bridge region along the conveying direction, said rail unit including a moving seat movable along the conveying direction;
a delivery device that is movably mounted to said rail unit and that is movable in said process region and said bridge region, said delivery device including:
a carrier seat that is mounted to said moving seat,
a conveyor unit that is mounted to said carrier seat, and
a conveyor belt that is adapted to carry the shoe sole and to move the shoe sole on said rail unit; and
a transfer device that is connected to said rail unit and located adjacent to said bridge region of said rail unit, and said transfer device including:
a base shell,
a transfer roller assembly rotatably mounted to said base shell,
an actuating device operable to drive rotation of said transfer roller assembly, and
a transfer belt surrounding said transfer roller assembly, being drivable by said transfer roller assembly, and being adapted to carry the shoe sole,
wherein when said delivery device is in said bridge region, said conveyor belt of said delivery device is adjacent to said transfer belt of said transfer device, and is operable to convey the shoe sole onto said transfer belt;
said conveyor unit includes:
a unit shell,
a delivery roller assembly that is rotatably mounted to said unit shell, and
a driving device that is mounted to said unit shell and that is operable to drive rotation of said delivery roller assembly; and
said conveyor belt surrounds said delivery roller assembly and is drivable by said delivery roller assembly.

2. The transport apparatus as claimed in claim 1, wherein said rail unit includes a rail that extends along the conveying direction, said moving seat is movably mounted to said rail.

3. The transport apparatus as claimed in claim 2, wherein said delivery device further includes a protection cover that is mounted to a top end of said conveyor unit and that cooperates with said conveyor belt to define a channel extending along the conveying direction and adapted for the shoe sole to pass therethrough.

4. The transport apparatus as claimed in claim 1, wherein:
said delivery roller assembly includes two delivery rollers and a driving roller that is rotatably mounted to said unit shell and that is located below said delivery rollers;
said conveyor belt surrounds said delivery rollers and said driving roller; and
said conveyor unit further includes a driving gear set that is connected between said driving device and said driving roller of said delivery roller assembly such that said conveyor belt is drivable by said driving device through said driving gear set and said driving roller.

5. The transport apparatus as claimed in claim 1, wherein:
said transfer roller assembly includes
two transfer rollers, and
an actuating roller that is rotatably mounted to said base shell and that is located below said transfer rollers;
said transfer belt surrounds said transfer rollers and said actuating roller; and
said transfer device further includes an actuating gear set that is connected between said actuating device and said actuating roller of said transfer roller assembly such that said transfer belt is drivable by said actuating device through said actuating gear set and said actuating roller.

6. A transport apparatus adapted to convey a shoe sole along a conveying direction, said transport apparatus comprising:
a rail unit that is divided into a process region and a bridge region along the conveying direction;
a delivery device that is movably mounted to said rail unit and that is movable in said process region and said bridge region, said delivery device including a conveyor belt that is adapted to carry the shoe sole and to move the shoe sole on said rail unit; and
a transfer device that is connected to said rail unit and located adjacent to said bridge region of said rail unit, and said transfer device includes:
a base shell,
a transfer roller assembly rotatably mounted to said base shell,
an actuating device operable to drive rotation of said transfer roller assembly, and
a transfer belt surrounding said transfer roller assembly, being drivable by said transfer roller assembly, and being adapted to carry the shoe sole,
wherein when said delivery device is in said bridge region, said conveyor belt of said delivery device is adjacent to said transfer belt of said transfer device, and is operable to convey the shoe sole onto said transfer belt, and
said transfer device further includes two guiding plates that extend along the conveying direction, that are mounted to said base shell, that are respectively located at opposite sides of said transfer belt, and that are adapted for guiding the shoe sole to be conveyed therebetween along the conveying direction.

7. The transport apparatus as claimed in claim 6, wherein each of said guiding plates has a main body and two guiding sections that are respectively connected to opposite ends of said main body and that each extend away from said main body and said transfer belt.

8. A transport apparatus adapted to convey a shoe sole along a conveying direction, said transport apparatus comprising:
a rail unit that is divided into a process region and a bridge region along the conveying direction;
a delivery device that is movably mounted to said rail unit and that is movable in said process region and said bridge region, said delivery device including a conveyor belt that is adapted to carry the shoe sole and to move the shoe sole on said rail unit; and
a transfer device that is connected to said rail unit and located adjacent to said bridge region of said rail unit, and said transfer device includes:
a base shell,
a transfer roller assembly rotatably mounted to said base shell,
an actuating device operable to drive rotation of said transfer roller assembly, and
a transfer belt surrounding said transfer roller assembly, being drivable by said transfer roller assembly, and being adapted to carry the shoe sole,
wherein when said delivery device is in said bridge region, said conveyor belt of said delivery device is adjacent to said transfer belt of said transfer device, and is operable to convey the shoe sole onto said transfer belt;

said transfer roller assembly includes:
  two transfer rollers, and
  an actuating roller that is rotatably mounted to said base shell and that is located below said transfer rollers;

said transfer belt surrounds said transfer rollers and said actuating roller; and said transfer device further includes an actuating gear set that is connected between said actuating device and said actuating roller of said transfer roller assembly such that said transfer belt is drivable by said actuating device through said actuating gear set and said actuating roller.

\* \* \* \* \*